Sept 10, 1957 E. A. STEINBOCK, JR 2,806,123
STERILIZER
Filed Sept. 12, 1949 3 Sheets-Sheet 2
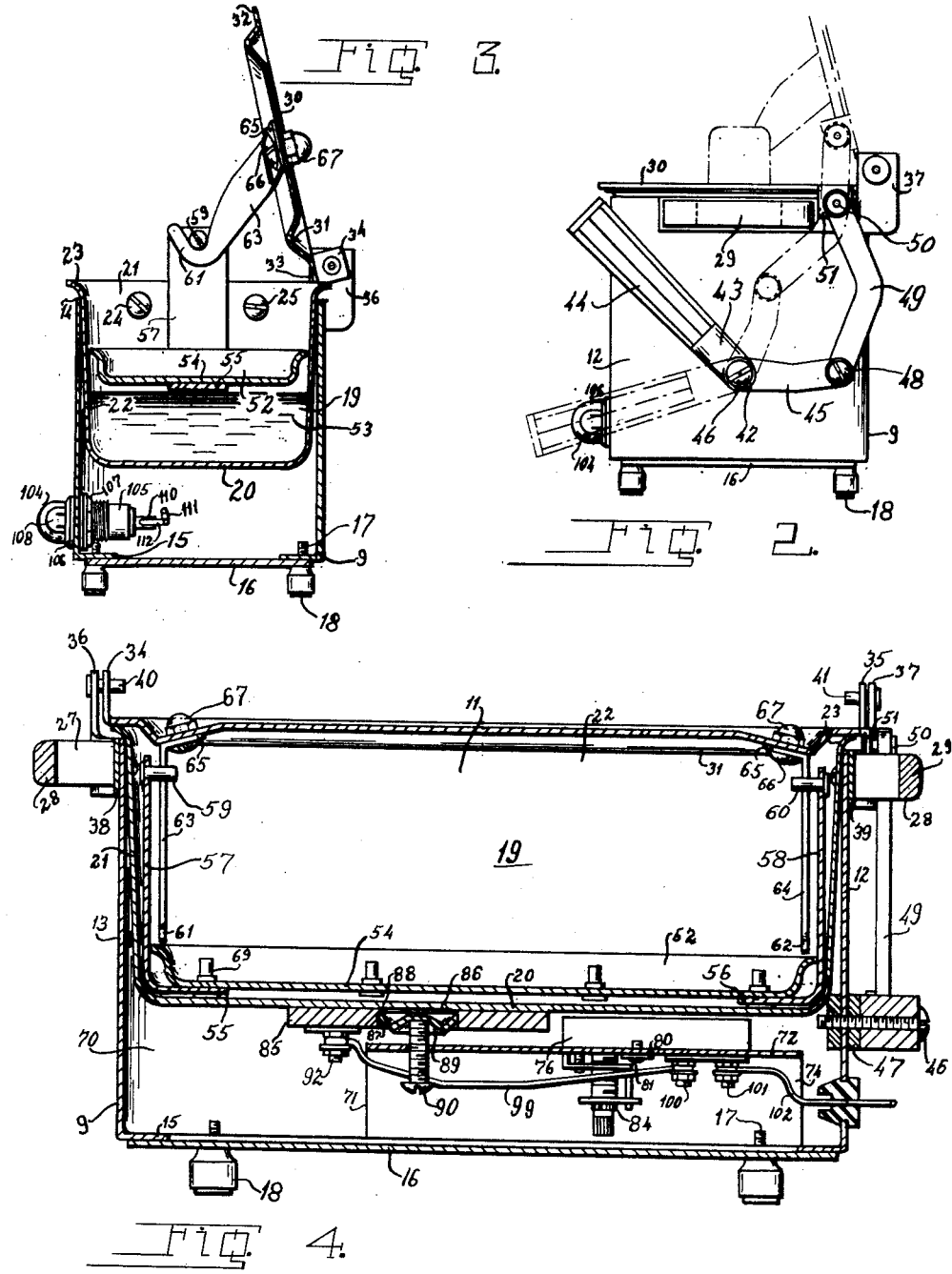
INVENTOR.
EDMUND A. STEINBOCK, JR
BY
Joseph A. Rave
ATTORNEY Sept 10, 1957  E. A. STEINBOCK, JR  2,806,123
STERILIZER
Filed Sept. 12, 1949  3 Sheets—Sheet 3

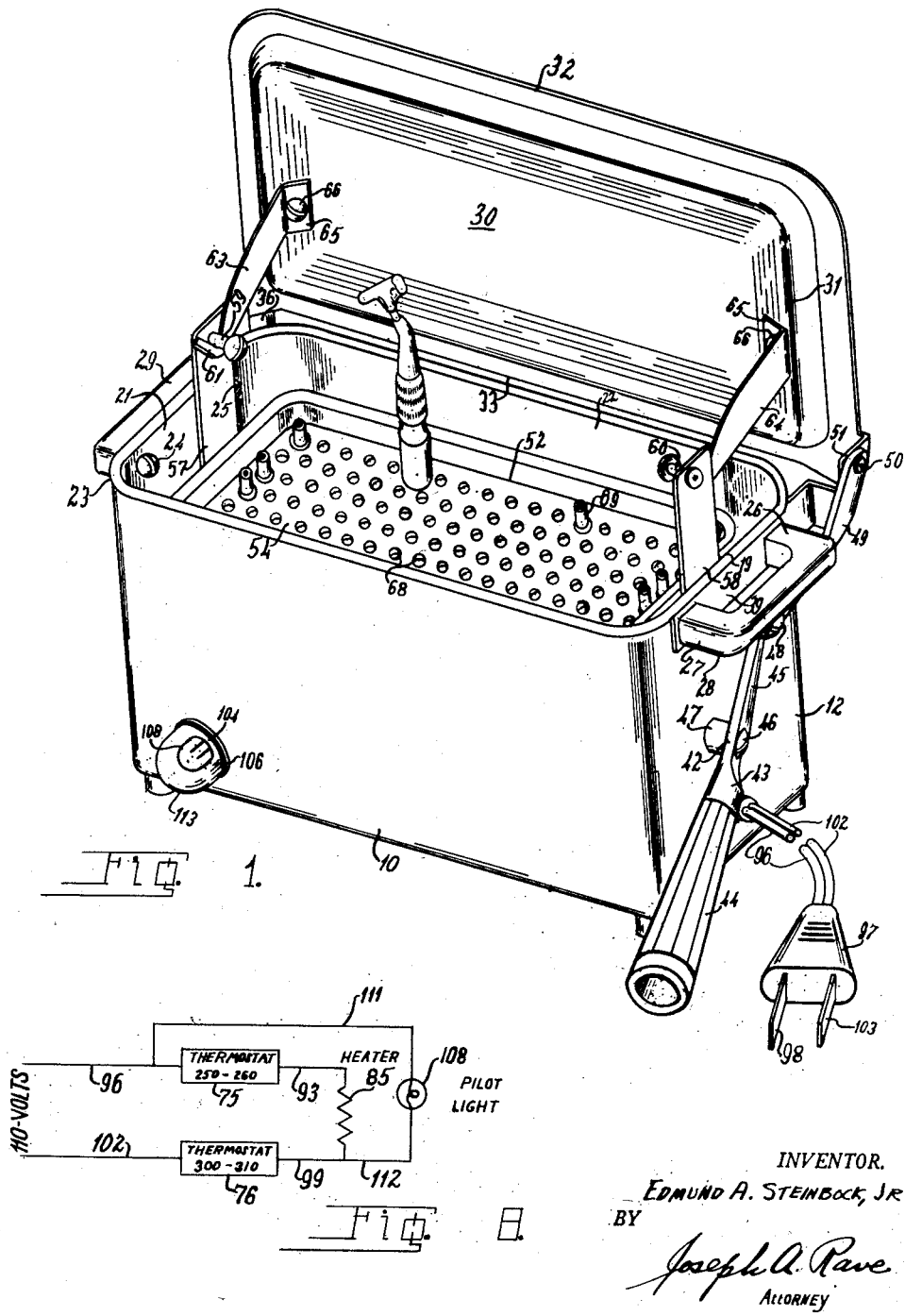

INVENTOR.
EDMUND A. STEINBOCK, JR
BY
Joseph A. Rave
ATTORNEY

United States Patent Office 2,806,123
Patented Sept. 10, 1957

2,806,123
STERILIZER

Edmund A. Steinbock, Jr., Louisville, Ky.

Application September 12, 1949, Serial No. 115,243

8 Claims. (Cl. 219—44)

This invention relates to improvements in sterilizers and particularly to improvements in oil sterilizers which will find their principal use in dental offices, doctors' offices, and similar offices where instruments are to be cleaned, sterilized and lubricated.

The oil sterilizer of this invention represents a concerted effort to obviate faults and disadvantages present in sterilizers, generally, and particularly, oil sterilizers as heretofore found on the market. The sterilizer of the present invention while representing a studied effort to produce an engineered finished product also represents a sterilizer that is extremely simple in construction and economical to produce and acquire.

An object of this invention is the provision of a sterilizer having a hinged cover which is uder the control of a lever or handle that is outside of the device so as not to be unduly heated by the sterilizer and at the same time enable the said lid or cover to be raised and lowered with a minimum of effort.

Another object of this invention is the provision of an oil sterilizer having the container and lid or cover so related to one another that with the said lid or cover in a raised position any condensate on the cover is drained into the container without interfering with the operator or user and said condensate is prevented from discharge or draining onto the table or other support for the sterilizer.

A further object of this invention is the provision of a sterilizer as above set forth which is provided with handles whereby it may be safely moved from place to place without inconvenience to the mover while hot and at the same time without spilling the content thereof.

Another object of this invention is the provision of control means in an oil sterilizer which will maintain the oil at a substantially uniform heat, being the heat which science has found to be the most effective for sterilization, while at the same time combining therewith a safety control for automatically shutting off the sterilizer before it reaches the point of danger to the device, the surroundings and the operator or attendant.

A still further object is the provision in a sterilizer of means for visually indicating that the sterilizer is functioning normally or is improperly functioning and is becoming over heated and requires attention.

A still further and specific object of this invention is the provision of an oil sterilizer particularly for use by dentists and dental technicians.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a perspective view of an oil sterilizer embodying the improvements of this invention.

Fig. 2 is an end elevational view of the sterilizer of Fig. 1 as seen from the right-hand end thereof with the lid or cover closed.

Fig. 3 is a transverse sectional view through the sterilizer of Fig. 1 taken just inside of the left-hand end of the sterilizer.

Fig. 4 is a substantially central, vertical, sectional view on an enlarged scale of the sterilizer.

Fig. 8 is a wiring diagram of the electrical parts utilized in effecting and controlling the heating of the sterilizing liquid and for indicating the condition of operaton of the sterilizer.

Throughout the several views of the drawings similar reference characters are employed to denote the same or similar parts.

Figure 5:
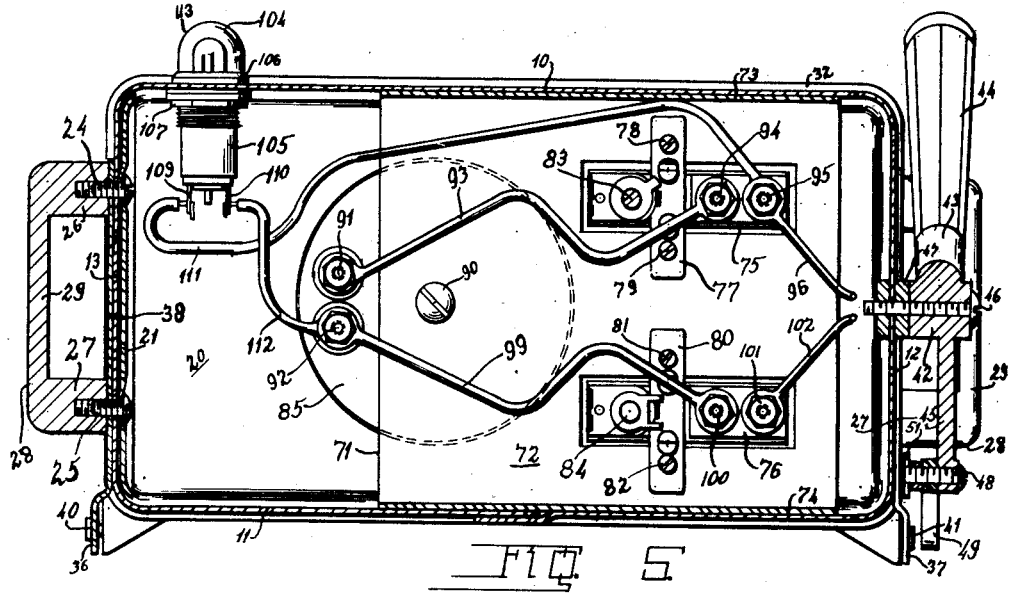
Fig. 5 is a view partly in section and partly in elevation as seen from line 5—5 on Fig. 4.

The sterilizer of the present invention comprises an outer housing or shell 9 substantially rectangular in plan view and including, as seen in Fig. 1, a front wall 10, a back wall 11, a right-hand end wall 12, and a left-hand end wall 13 each of which has its upper end 14 in substantially the same plane. The lower ends of the housing or shell walls are inwardly turned to provide a flange 15 against which is disposed a bottom closing plate 16. The bottom closing plate 16 is held in position by means of screws 17 which are threaded into the front and back flanges 15 near their outer ends and which screws 17 project from suitable supporting feet 18 that clamp the said bottom plate between themselves and the said shell front and back flanges 15.

Disposed within the upper end of the main housing or shell 9 is a container 19 comprising a bottom 20 and upstanding end walls 21 and side walls 22. The said container side and end walls have their upper ends outwardly flared or beaded as at 23 to overlie the upper ends 14 of the main housing or shell front, back and end walls.

The container 19 and main housing or shell 9 are secured in operative position by having their respective adjacent end walls 21, 12 and 13 provided with aligned apertures through which pass screws 24 and 25, respectively, threaded into legs 26 and 27 of a handle 28 which has the outer ends of the legs connected by the body portion 29 of said handle. In other words each handle 28 is substantially U-shaped with the body portion 29 as the base and outwardly spaced from the main housing or shell end walls 12 and 13 so that the said handle portion is maintained at all times in a cool condition.

Figures 6, 7:
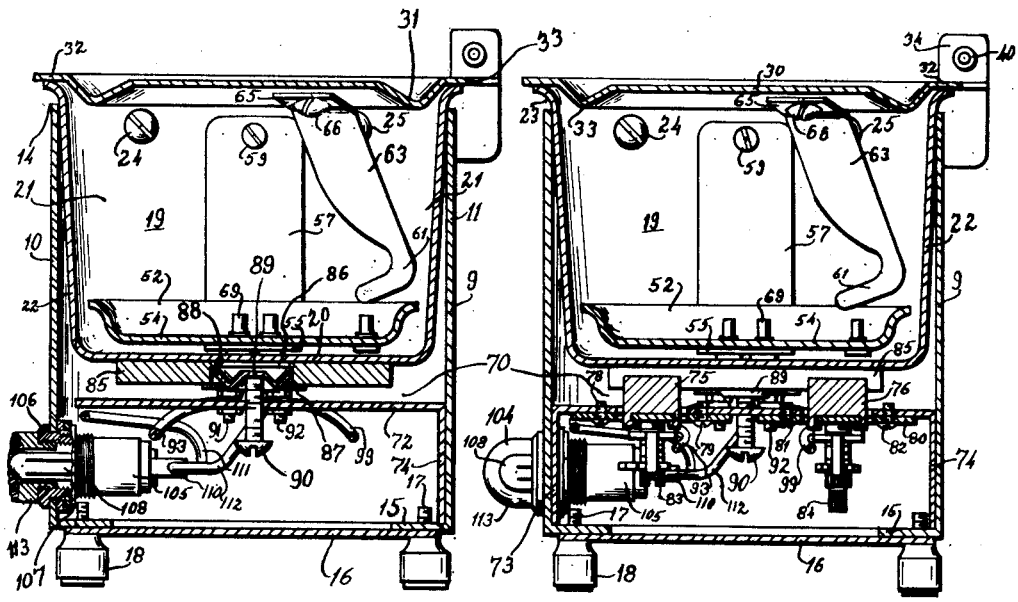
Fig. 6 is a staggered vertical sectional view as seen from line 6—6 on Fig. 5.
Fig. 7 is a vertical sectional view similar to Fig. 6 taken on a plane behind Fig. 6 as seen from line 7—7 on Fig. 5.

Disposed on the sterilizer is a lid or cover 30 provided with an inwardly projecting rib or bead 31 which substantially parallels the edges of said lid and provides outwardly thereof a peripheral flange 32 which when the lid is in a closed position rests on the outwardly flared or beaded upper end of the container end and side walls 21 and 22 as clearly illustrated in Figs. 4, 6 and 7. The said lid or cover 30 is provided with a rear edge 33 at the opposite ends of which upstand hinge lugs 34 and 35. It should be noted, particularly from Figs. 6 and 7, that said hinge lugs project somewhat rearwardly beyond the rear edge 33 of the lid or cover 30 for a purpose presently to be made clear.

Each of the hinge lugs 34 and 35 is located inwardly of complementary hinge lugs 36 and 37 respectively upstanding from a plate or bracket 38 and 39 disposed respectively at each end of the sterilizer and particularly at each end of the main housing or shell. As seen in Fig. 5 each of the brackets 38 and 39 underlies the handle 28 at its end of the sterilizer and each handle has its legs 26 and 27 in face contact with its bracket 38 or 39. Each of the brackets 38 and 39 is provided with apertures in alignment with the apertures of the main housing or shell and container end walls at its end of the sterilizer and through which bracket apertures the screws 24 and 25 pass before entering the handle legs 26 and 27, as above set forth. The lid or cover hinge lugs 34 and 35 and their respective bracket hinge lugs 36 and 37 are provided with aligned apertures whereby the lugs 34 and 36 are connected by a hinge pin or pivot 40 while the hinge lugs 35 and 37 are connected by a similar hinge pin or pivot 41.

It should be here noted that the outer shell 9, the container 19, the handles 28, and the lid brackets 38 and 39 are all connected with one another through the medium of a pair of screws 24 and 25 at each end of the sterilizer. In other words the sterilizer is practically completely assembled and secured in assembled position by four small machine screws which rigidly, substantially permanently, connect the parts to one another.

The cover or lid 30 is adapted to be raised from the solid line closed position in Fig. 2 to the solid line open position in Fig. 3 by means of operating mechanism located on the right-hand end wall 12 of the main housing or casing. As shown, this means comprises a lever 42 in the form of a bell crank comprising an arm 43 to which is secured a handle member 44, of heat resisting material, and an arm 45. The said lever 42 is pivoted by a bolt or screw 46 to the said main housing end wall 12 as seen most clearly in Fig. 4. The said bolt or screw 46 is retained in position by lock nuts 47. Pivotly connected to the outer end of bell crank arm 45, as by a screw 48, is one end of a link 49 which has its other end connected by a pivot 50 to a lug 51 depending from the end of the cover or lid 30. As will be noted from Fig. 1 the lug 51 is inwardly of the rear edge of the cover or lid 30.

In operation the handle 44 is actuated from its solid line position in Fig. 2 to its phantom line position for thereby oscillating the said lever 42, which through the link 49 upwardly swings the cover or lid 30. Due to the rearward position of the cover or lid hinge pins or pivots 40 and 41, the rear edge 33 of the said cover or lid 30 is inwardly swung relative to the container 19 as clearly illustrated in Fig. 3. By this construction any condensate on the undersurface of the lid, which will drop therefrom by gravity, is deposited within said container thereby prohibiting the said condensate from being collected on the support of the sterilizer. It should be further noted that the relation of the lever pivot screw 46, hinge screw 48 and rivet pivot 50 are such that, with the parts in the dotted line position of Fig. 2, the cover or lid is retained in its open position until positively lowered by raising the handle from its phantom line position to its solid line position for thereby throwing the pivot screw 48 rearwardly of the line between the centers of the screw 46 and rivet 50 to permit the cover or lid to close.

Disposed within the container 19 is a tray or support indicated in its entirety by the reference numeral 52 which is employed for supporting instruments that are to be lowered into the sterilizing liquid, oil, shown in Fig. 3 and indicated by the reference numeral 53. The said tray or support is adapted to be automatically actuated, from its operative position within the said liquid or on the bottom 20 of the container as shown in Fig. 4, or above the level of the oil 53 as shown in Fig. 3, by the operation of the lid or cover 30. In order to accomplish this the said tray or support 52 has connected to its bottom 54 the inturned ends 55 and 56, respectively, at the lower ends of upstanding posts 57 and 58. Each of said posts 57 and 58 is provided at its upper end with a trunnion 59 and 60 respectively received in hooked shaped ends 61 and 62 at the free ends of arms 63 and 64 projecting from the cover or lid 30. Any suitable or desirable means may be employed for securing the arms 63 and 64 to the cover 30 that shown in the drawings comprising the upsetting of the ends of the arms 63 and 64 to form a foot 65 on each arm through which passes a screw 66 which projects exteriorly of the lid or cover to receive a nut 67. It will be appreciated that the bottom 54 of the support or tray 52 is provided with a plurality of apertures 68 whereby the liquid is readily disposed above the said tray for immersing the articles carried thereby in the oil.

The construction of the tray is fully disclosed and claimed in a co-pending application which sets forth the purpose of the upstanding hollow posts or sleeves 69 disclosed in the drawing and since they form no specific part of the present application this construction is not further described herein. It should be noted, however, that said hollow posts or sleeves 69 are adapted to support hollow articles, such as "handpieces" used by dentists, to permit the draining of the sterilizing medium, oil, from the interior thereof.

The space 70 between the container bottom 20 and main housing or shell bottom plate 16 is employed for enclosing the electric heating and control mechanism as well as the support for said heating and control mechanism.

The support for the heating and control mechanism comprises a bracket 71 substantially U-shaped in cross-section and including a base 72 with depending flanges or legs 73 and 74 at two opposed sides thereof. The bracket 71 is disposed within the space 70 and has its legs 73 and 74 disposed on the main housing or shell inwardly extending flanges 15 with the base 72 thereof below the bottom 20 of the container. Carried by said bracket base 72 is a control thermostat 75 and a safety thermostat 76. The control thermostat 75 is provided with a mounting strap 77 through which mounting screws 78 and 79 pass for securing the thermostat to the bracket base 72. The safety thermostat 76 is similarly provided with a mounting strap 80 through which passes mounting screws 81 and 82 for securing the said safety thermostat to the bracket base 72. The control thermostat 75 is provided with an adjusting screw 83 so as to cut out when the temperature of the sterilizing liquid, oil, reaches the desired temperature, for example, 260° F. This control thermostat is designed to cut in when the temperature of the sterilizing liquid drops to a given point, for example, 250° F. The safety thermostat is likewise provided with an adjusting screw 84 for operation at temperatures in excess of that at which it is desired to maintain the sterilizing medium, but at temperatures which will prevent damage to the sterilizer, the surroundings, and the electrical wiring system, as will presently be made clear.

Mounted below the sterilizing container bottom 20, partially between the mounting bracket base 72 and the bottom of the sterilizing medium container bottom 20, and partially beyond the said mounting bracket, is a heater 85 which is illustrated as a ring with a central aperture 86. The heater 85 is held in face contact with the bottom 20 of the container so as to heat said container bottom 20 and thereby heat the sterilizing medium, oil. Any suitable or desirable means may be employed for effecting the proper contact of the heater 85 with the container bottom 20, that shown in the drawings, particularly Fig. 6, includes a counter bore 87 substantially centrally of the heater ring 85 thereby providing an inwardly projecting radial flange 88. Disposed on said flange 88 is the edge of a substantially cup-shape disc 89 which has bearing against its center the free end of a screw 90. The screw 90 is threaded through a suitable threaded aperture in the mounting bracket base 72.

In practice, the parts are so designed that the heater is located closely adjacent the center of the container bottom 20 whereupon the screw 90 is actuated to effect a tight engagement of the said heater 85 with the container bottom 20 through the medium of the cup-disc 89. By this construction the reacting clamping pressure of the screw 90 forces the mounting bracket legs 73 and 74 into tight clamping engagement with the main housing or shell flanges 15 for thereby securely clamping the bracket 71, and all parts carried thereby, in operative position.

The heater 85 is provided with a pair of binding posts 91 and 92 respectively at the ends of the electrical heating element associated with and interiorly of the heater ring. The binding post 91 has connected therewith one end of a wire or lead 93 which has its other end connected to a binding post 94 associated with the control thermostat 85. A second binding post 95 of the control thermostate 75 has connected therewith one end of a wire 96 which terminates, see Fig. 1, in the usual appliance connecting plug 97 which has projecting therefrom the usual prong 98 for connection with one wire of a suitable commercial source of electrical current. The second binding post 92 of the heater 85 has connected therewith one end of a wire 99 that has its other end connected with a binding post 100 of the safety thermostat 76. A second binding post 101 of the safety thermostat 76 has connected therewith a wire 102 which, like the wire 96, terminates in the appliance connecting plug 97 and the second prong 103 of the appliance attaching plug 97.

The wiring of the parts are diagrammatically illustrated in Fig. 8 and it is believed the operation of these parts is obvious from said Fig. 8 as well as the structural wiring of Fig. 5. Briefly, however, the operation is as follows: the current flow from the commercial electrical source, indicated in Fig. 8 as 110 volts A. C. current, is by way of wire 96 to the control thermostat 75, from the control thermostat 75 by way of wire 93 to the electric heater 85, or resistance element thereof, from which the current flow is by way of wire 99, safety thermostat 76 and wire 102 back to the commercial current source. The operation of the circuit will continue until the heater 85 raises the temperature of the sterilizing liquid, oil, 53 to the desired temperature, which as indicated above by way of example, is 260° F. At this point the control thermostat 75 opens to discontinue current flow through the heater 85 and which discontinued flow lasts until the said sterilizing medium temperature drops to 250° F. whereupon the thermostat closes for establishing a current flow. In the event damage occurs to the thermostat 75 so that it does not open and the temperature of the sterilizing medium 53 rises above 260° F. the said temperature will continue to rise until it operates the safety thermostat 76. In one commercial embodiment the said safety thermostat 76 is set to open at 310° F., but this setting may be varied depending on the conditions obtaining or the use to which the sterilizer is put. In order that the sterilizer does not completely shut off, the safety thermostat is set so that it will cut in at approximately 300° F. This increase heat around the sterilizer will soon make itself known to the attendant who will realize that the control thermostat is out of order and proceed to repair or replace the same.

In order that the user may at all times know the condition of the sterilizer and that it is functioning properly, there has been incorporated in the circuit a visual signal in the form of a pilot light indicated in its entirely by the reference numeral 104. As seen in Fig. 5 the pilot light 104 comprises a socket 105 of an accepted construction mounted in the main housing or casing front wall 10 through the medium of a shouldered sleeve 106 secured in position by a lock nut 107 on the socket proper 105. The socket 105 is adapted to receive a bulb 108 which may be of either the incandescent type or of the gas filled type. In either event the socket is provided with a pair of suitable terminals 109 and 110 with the former of which is connected one end of a wire or lead 111 while the latter has similarly connected to it one end of a wire or lead 112. The wire or lead 111 has its other end connected with the binding post 95 of the control thermostat 75 while the wire 112 has its other end connected with the heater binding post 92.

As will be evident from the wiring diagram of Fig. 8 and the structural wiring disclosure of Fig. 5 the instant current flows into the wire 96 it will immediately flow through wire 111 to the bulb 108 and will flow from the bulb 108 through the wire 112 to the wire 99, safety thermostat 76 and wire 102 thereby lighting the pilot light and advising the operator of the operation of the sterilizer. The pilot light or bulb 103 will remain lit so long as there is a flow in wire 96 even though the control thermostat opens the circuit when the temperature of the sterilizing medium reaches its desired maximum heat of 260° F. Should, however, the control thermostat 75 become damaged so that it does not open and requires the opening of the safety thermostat 76 the pilot light will remain lit until the safety thermostat opens which will break the circuit to the pilot light 103 so that the same goes out and thereby notify the operator of the damaged control thermostat 75. It is of course understood that when the safety thermostat subsequently cuts in, the pilot light 108 will again become lit and it is this flashing of the pilot light which attracts the operator's attention to the fact that the control thermostat is out of order.

In order to protect the pilot light bulb 108 a transparent housing 113 is provided which has its inner end reduced and threaded into the sleeve 106 for thereby encasing or enclosing the bulb 108.

From the foregoing, it will now be appreciated that there has been provided a sterilizer that accomplishes the objects initially set forth.

What is claimed is:

1. In a sterilizer of the class described the combination of a rectangular housing, a sterilizing liquid container within said housing extending downwardly from the upper end of the housing, said housing and container having end walls with portions just below their upper edges in contact with one another, handles exteriorly of the housing end walls, and securing screws passing through the contacting portions of the housing and container end walls into the handles and forming the sole means for securing the said housing, container and handles to one another.

2. In a device of the class described the combination of a housing, a sterilizing liquid container within said housing extending downwardly from the upper end of the housing, said housing and container having end walls with portions just below their upper edges in contact with one another, handles exteriorly of the housing end walls, securing screws passing through the contacting portions of the housing and container end walls into the handles for securing the said housing, container and handles to one another, a cover for the container, and means exteriorly of the housing end walls for hingedly mounting said cover for oscillation toward and from the container, comprising a bracket located between each handle and housing end wall secured in position by the housing and container securing screws, hinge lugs on said brackets projecting above the housing, cooperating hinge lugs on said cover hinge, and hinge pins connecting the brackets and cover lugs.

3. In a device of the class described the combination of a housing, a sterilizing liquid container within said housing extending downwardly from the upper end of the housing, said housing and container having end walls with portions just below their upper edges in contact with one another, handles exteriorly of the housing end walls, securing screws passing through the contacting portions of the housing and container end walls into the handles for securing the said housing, container and handles to one another, a cover for the container, and means exteriorly of the housing end walls for hingedly mounting said cover for oscillation toward and from the container, comprising a bracket located between each handle and housing end wall secured in position by the housing and container securing screws, hinge lugs on said brackets projecting above the housing, cooperating hinge lugs on said cover, and hinge pins connecting the bracket and cover lugs, said cover having a rear edge, and said bracket and cover hinge lugs and hinge pins being so located above said cover rear edge that oscillation of the cover to an open position disposes the cover rear edge over the container.

4. In a device of the class described the combination of a housing having back, front and end walls, a sterilizing liquid container having back, front and end walls within said housing extending downwardly from the upper edge of the housing back, front and end walls, said housing and container having their end walls in contact with one another for at least a portion transversely thereof just below the upper edges, handles exteriorly of the housing end walls, securing screws passing through the contacting portions of the housing and container end walls into the handles for securing the said housing, container and handles to one another, said housing having the lower ends of its front and back walls inwardly bent to provide flanges, said container including a bottom located upwardly of the housing front and back wall flanges, heating means within the housing below the container bottom in contact with said container bottom for heating the liquid within the container, and means for removably securing the heating means in position including a bracket supported by said housing front and back walls flanges, and a clamp mechanism carried by the bracket operable through the bracket for removably forcing the heating means against the container bottom and the bracket against the housing front and back wall flanges so that loosening of said clamp mechanism will permit removal of said heating means and bracket.

5. In a device of the class described the combination of a housing having back, front and end walls, a sterilizing liquid container having back, front and end walls within said housing extending downwardly from the upper edge of the housing back, front and end walls, said housing and container having their end walls in contact with one another for at least a portion transversely thereof just below the upper edges, handles exteriorly of the housing end walls, securing screws passing through the contacting portions of the housing and container end walls into the handles for securing the said housing, container and handles to one another, said housing having the lower ends of its front and back walls inwardly bent to provide flanges, said container including a bottom located upwardly of the housing front and back wall flanges, heating means within the housing below the container bottom in contact with said container bottom for heating the liquid within the container, a U-shaped bracket having a base and depending legs from the ends of the base with said legs disposed on the housing front and back wall flanges and said base disposed below the heating means, and clamp means carried by said U-shaped bracket base for removably securing the heating means against the container bottom and the bracket legs against the housing front and back flanges.

6. In a device of the class described the combination of a housing, a sterilizing liquid container within said housing extending downwardly from the upper end of the housing, said housing and container having end walls with portions just below their upper edges in contact with one another, handles exteriorly of the housing end walls, securing screws passing through the contacting portions of the housing and container end walls into the handles for securing the said housing container and handles to one another, a cover having a rear edge for the container, means exteriorly of the housing end walls for hingedly mounting said cover for oscillation toward and from the container comprising cooperating hinge lugs on the container and cover hingedly connected to one another and located above the said cover rear edge, and means for oscillating the cover comprising a bell crank pivotly mounted on one housing end wall, a handle member on one leg of the bell crank, and a link having one end pivotly connected to the second leg of the bell crank and its other end pivotly connected to the cover inwardly of its hinge lugs so that operation of the bell crank about its pivot effects oscillation of the cover from the container and moves the cover rear edge over the container.

7. In a sterilizer of the class described the combination of a housing including front, back and end walls, a sterilizing liquid container including front, back and end walls disposed within the housing and with said liquid container having the upper ends of its front, back and end walls outwardly flared above the front, back and end walls of the housing, said housing and container end walls contacting one another transversely thereof for a portion below the upper edge of the housing end walls, handles exteriorly of the housing end walls at about the line of transverse contact of said housing and container end walls, and securing screws passing through the housing and container end walls at their line of contact into the handles and forming the sole means for securing said housing, container, and handles to one another.

8. In a sterilizer of the class described the combination of a housing including front, back and end walls, a sterilizing liquid container including front, back and end walls disposed within the housing and with said liquid container having the upper ends of its front, back and end walls outwardly flared above the front, back and end walls of the housing, said housing and container end walls contacting one another tarnsversely thereof for a portion below the upper edge of the housing end walls, a U-shaped handle exteriorly of each housing end wall including a body portion and legs at each end of the body portion with said legs contacting their end wall at the line of transverse contact of the housing and container end walls, and securing screws passing through the housing and container end walls into the handles legs and forming the sole means for securing said housing, container, and handles to one another.

References Cited in the file of this patent

UNITED STATES PATENTS

| | | |
|---|---|---|
| 1,019,198 | Spears | Mar. 5, 1912 |
| 1,096,916 | Hoffmann | May 19, 1914 |
| 1,192,477 | Underwood | July 25, 1916 |
| 1,569,788 | Sanborn | Jan. 12, 1926 |
| 1,939,715 | Meitzler | Dec. 19, 1933 |
| 2,088,728 | Stransky | Aug. 3, 1937 |
| 2,230,238 | Duberstein | Feb. 4, 1941 |
| 2,239,128 | Sykes | Apr. 22, 1941 |
| 2,369,932 | Allen | Feb. 20, 1945 |
| 2,497,326 | Schipanski | Feb. 14, 1950 |
| 2,522,718 | Huck | Sept. 19, 1950 |
| 2,526,566 | Kolisch | Oct. 17, 1950 |

FOREIGN PATENTS

| | | |
|---|---|---|
| 463,745 | Great Britain | Apr. 6, 1937 |